United States Patent [19]

Popov et al.

[11] 4,451,294
[45] May 29, 1984

[54] WATER RESISTANT AND HEAT INSULATING MATERIAL AND METHOD OF MAKING SAME

[75] Inventors: Marin A. Popov; Todor G. Georgiev, both of Sofia, Bulgaria

[73] Assignee: Knipsm "Zavodproekt", Sofia, Bulgaria

[21] Appl. No.: 412,961

[22] Filed: Aug. 30, 1982

[51] Int. Cl.$^3$ .............................................. C04B 21/00
[52] U.S. Cl. .............................. 106/75; 106/DIG. 1
[58] Field of Search ........................... 106/75, DIG. 2

[56] References Cited

U.S. PATENT DOCUMENTS 2,117,605  5/1938  Fowler et al. ...................... 106/75

FOREIGN PATENT DOCUMENTS 104626  9/1978  Japan .................................. 106/75

Primary Examiner—James Poer

[57] ABSTRACT

This invention relates to a composition, and a method for its production, of a water resistant and heat insulating silicate material in the form of blocks and articles. Such water resistant and heat insulating material possesses a low bulk mass (of from 100 to 300 kg/m$^3$) and improved heat insulating capacity (=0.04–0.1 W/m.deg.) with a compressive strength of from 0.3 to 1 MPa. The starting chemical composition for the production of the heat insulating material is comprehended within the following limits: $SiO_2$ of from 62 to 68%; $Al_2O_3$ of from 1.5 to 5%; $B_2O_3$ of from 5 to 10%; $CaO+MgO$ of from 0.1 to 0.5% and $Na_2O$ of from 21 to 26%, all percentages being by weight. The light porous silicate articles so produced include the following components (in weight percent): liquid sodium silicate having a modulus of from 2.5 to 3.5—from 55 to 65%; ground solid sodium silicate—from 11 up to 22%; borax—of from 7.4 up to 14%; and perlite—from 6 up to 17%. Green perlite as well as residual fine fraction of expanded perlite can be used.

5 Claims, No Drawings

WATER RESISTANT AND HEAT INSULATING MATERIAL AND METHOD OF MAKING SAME

This invention relates to a composition of water resistant and heat insulating silicate material in the form of blocks and articles, and a method of its production.

There are known both a composition and a method of production of porous silicate articles. See Bulgarian Certificate of Authorship No. 23622 filed July 25, 1977. Said composition is a mixture of (1) sodium hydropolysilicate and (2) fine milled silicate fillers such as sand, chalcedonolite, slag, stearyl alcohol and perlite in a ratio of 1 to 2 from 1:1 up to 1:10. Said method consists in a preliminary preparation of sodium hydropolysilicate by heating a mixture of liquid sodium silicate and solid sodium silicate in a ratio of from 5:1 up to 1:1 on a water bath; drying the material so obtained at a temperature of 303 degrees K. to a dry matter content of from 45 to 55%; admixing it with silicate fillers in weight ratios of from 1:1 up to 1:10, and milling the mixture in a ball mill to not more than 10% fraction left on a sieve with 900 screen holes/cm$^2$K. The material so milled is submitted to granulation in the presence of from 7 to 20% water addition. The granules are placed in iron molds of different sizes and the material is compressed at a pressure of from 0.2 to 0.5 MPa. The iron molds are introduced in an electric furnace heated to a temperature of 473 degrees K. where baking at a temperature of 823-873 degrees K. is performed for a time of 2 hours. It is a disadvantage of said method that the final product sticks to the metal mold as well as that the technology is too complex. The disadvantages of the heat insulating articles so prepared are their high bulk mass and low heat insulating capacity. When no silicate fillers are used with the sodium hydropolysilicate, the articles possess low bulk mass (i.e. from 60 to 200 kg/m$^3$) and low coefficient of heat conductivity (=0.05-0.1 W/m. deg.), but their water resistance is poor, which results in their destruction even by the atmospheric moisture.

This invention has among its objects the provision of both composition and method of production of water resistant and heat insulating material, possessing a low bulk mass (from 100 to 300 kg/m$^3$) and improved heat insulating capacity ($\lambda$=0.04-0.1 W/m.deg.) with a compressive strength of from 0.3 to 1 MPa.

This object is achieved by providing a chemical composition of the heat insulating material comprehended within the following limits: $SiO_2$ of from 62 to 68%; $Al_2O_3$ of from 1.5 to 5%; $B_2O_3$ of from 5 to 10%; $CaO+MgO$ of from 0.1 to 0.5% and $Na_2O$ of from 21 to 26%. The essence of this invention consists in that the composition of the light porous silicate articles so produced includes the following components (in weight percent): liquid sodium silicate having a modulus in the range of from 2.5 to 3.5—from 55 up to 65%; milled solid sodium silicate from 11 up to 22%; borax—from 7.4 up to 14%; and perlite—from 6 up to 17%. Green perlite as well as residual fine fraction of expanded perlite can be used.

The method for production of heat insulating articles is as follows:

The liquid sodium silicate contained in a vessel provided with a stirrer of variable revolutions per minute is heated on a water bath and the milled solid sodium silicate is added thereinto. After heating the mixture to a temperature of 353 degrees K., borax is added as a boiling 30% solution thereof while stirring the mixture at high RPMs of the stirrer. Homogenization is performed, and then the perlite is added and the mixture is heated to a temperature of ca 373 degrees K., after which said mixture is poured onto a polyethylene foil and is cooled to room temperature. The homogeneous mixture is placed in a metal mold which has been preliminarily lubricated with superphosphate heated to a temperature of 873-973 degrees K., the mold being then introduced into a furnace heated to the same temperature. Due to the high temperature, the mixture expands and fills up the metal mold. The heating is continued for from 1 to 4 hours, depending on the size of the articles being heated. Then, the mold with the article is cooled slowly to room temperature and the article is removed. The process of burning can also be accomplished in a conveyor type furnace with the material in the form of a continuous strip, said strip being cut to size thereafter. The advantages of the invention are as follows:

the raw materials are native and easily available, the technology is simple, the heat insulating material is prepared at a lower temperature while possessing properties similar to those of foamed glass.

the heat insulating material is water resistant, fire proof and rot proof, and can be applied at temperatures of from 223 up to 823 degrees K.

The following examples throw more light on the invention:

EXAMPLE 1

The composition included:

32% solution of liquid sodium silicate having a modulus of 2.96-64.4% solid sodium silicate—21.4% borax—7.7% expanded perlite (residual fine fraction)—6.5%, all percentages by weight.

The mixture was baked at a temperature of Ca 923 degrees K. The article so prepared possessed a bulk mass of 200 kg/m$^3$; a compressive strength of 0.4 MPa, and a coefficient of heat conductivity $\lambda$=0.06 W/m.deg.

EXAMPLE 2

The composition included:

33% solution of liquid sodium silicate having a modulus of 2.9-64% ground solid silicate—11% borax—8% expanded perlite (residual fine fraction)—17%, all percentages by weight.

The mixture was baked at a temperature of Ca 923 degrees K. The articles possessed a bulk mass of 300 kg/m$^3$, a compressive strength of 1 MPa, and a coefficient of heat conductivity $\lambda$=0.08 W/m.deg.

EXAMPLE 3

The composition included:

30% solution of liquid sodium silicate having a modulus of 3-60% milled solid sodium silicate—20% borax—14% swelled perlite (residual fine fraction)—6%, all percentages by weight.

The mixture was baked at a temperature of Ca 923 degrees K. The article possessed a bulk mass of 180 Kg/m$^3$; compressive strength of 0.5 MPa and a coefficient of heat passage $\lambda$=0.05 W/m.deg.

EXAMPLE 4

The composition included:

30% solution of liquid sodium silicate having a modulus of 3–57% ground solid sodium silicate—19% green perlite (ground)—7.7% borax—13.3% expanded perlite (residual fine fraction)—3%, all percentages by weight.

The mixture was burned at a temperature of ca 953 degrees K. The article possessed a bulk mass of 150 kg/m$^3$ and a compressive strength of 0.3 MPa. The coefficient of heat conductivity $\lambda = 0.06$ W/m.deg.

EXAMPLE 5

The composition included:

35% solution of liquid sodium silicate having a modulus of 2.8–61.7% solid sodium silicate (ground)—20.6% borax—7.4% ground green perlite—10.3%, all percentages by weight.

The mixture was burned at a temperature of ca 873 degrees K. the article possessed a bulk mass of 240 kg/m$^3$, compressive strength of 0.6 MPa and a coefficient of heat conductivity $\lambda = 0.07$ W/m.deg.

The water resistance of the products prepared according to the Examples 1, 2, 3, 4 and 5 was tested by boiling the samples in water of a temperature of 100–105 degrees C. (373–378 degrees K.) for 42 hours. After the completion of the test, the test samples possessed the same dimensions that they did at the beginning of the test. No surface cracks and volume changes were observed after the test, and the hardness of the porous silicate structure was preserved, while the test samples, prepared using the sample composition No. 5 of Bulgarian Certificate of Authorship No. 23622, referred to above, and tested under the same conditions, decomposed in boiling water after a period of 10 to 30 minutes, giving jelly-like pieces. This is evidence that during the respective heat treatment, the presence of perlite (both green and burned) and of borax in the proper quantitative limits, promotes the favorable proceeding of chemical reactions which take place after the completion of the expansion process and result in the formation of a waterproof, fine porous silicate structure.

Although the invention is illustrated and described with reference to a plurality of embodiments thereof, it is to be expressly understood that it is in no way limited to the disclosure of such embodiments but is capable of numerous modifications within the scope of the appended claims.

We claim:

1. A composition for the production of waterproof and heat insulating silicate material, consisting essentially of $SiO_2$ of from 62 to 68%; $Al_2O_3$ of from 1.5 to 5%; $B_2O_3$ of from 5 to 10%; $CaO+MgO$ of from 0.1 to 0.5% and $Na_2O$ of from 21 to 26%, all percentages being by weight.

2. A composition for the production of waterproof and heat insulating silicate material according to claim 1, wherein said composition is prepared starting from liquid sodium silicate having a modulus of from 2.5 to 3.2 in an amount of from 55 up to 65%; solid sodium silicate in an amount of from 11 up to 22%; borax in an amount of from 7.4 up to 14%, and perlite in an amount of from 6 up to 17%, all percentages being by weight.

3. A method for the production of water proof and heat insulating light weight silicate articles from a composition consisting essentially of liquid sodium silicate having a modulus of from 2.5 to 3.2 in an amount of from 55 up to 65%; solid sodium silicate in an amount of from 11 up to 22%; borax in an amount of from 7.4 up to 14%, and perlite in an amount of from 6 up to 17%, all percentages being by weight, comprising heating said mixture of liquid sodium silicate, solid sodium silicate, borax and perlite on a water bath to a dry matter content of from 50 to 60%, cooling said thus treated mixture, and thereafter placing the mixture in a preheated and lubricated metal mold and baking it at a temperature of about 873°–973° K.

4. A method in accordance with claim 3, wherein the mold is lubricated with superphosphate.

5. A water proof and heat insulating self-sustaining shaped silicate article made from a composition consisting essentially of liquid sodium silicate having a modulus of from 2.5 to 3.2 in an amount of from 55 up to 65%; solid sodium silicate in an amount of from 11 up to 22%; borax in an amount of from 7.4 up to 14%, and perlite in an amount of from 6 up to 17%, all percentages being by weight, said article having a bulk mass of from 100 to 300 kg/m$^3$, a heat insulating capacity of $=0.04$ 0.1 W/m. degree, and a compressive strength of from 0.3 to 1 MPa.

* * * * *